(12) United States Patent
Lambert et al.

(10) Patent No.: US 10,146,963 B2
(45) Date of Patent: Dec. 4, 2018

(54) SYSTEMS AND METHODS FOR DYNAMIC EXTERNAL INPUT/OUTPUT PORT SCREENING

(71) Applicant: Dell Products L.P., Round Rock, TX (US)

(72) Inventors: Timothy M. Lambert, Austin, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 196 days.

(21) Appl. No.: 15/228,738

(22) Filed: Aug. 4, 2016

(65) Prior Publication Data

US 2018/0039797 A1    Feb. 8, 2018

(51) Int. Cl.
*G06F 21/85* (2013.01)
*G06F 13/42* (2006.01)

(52) U.S. Cl.
CPC .......... *G06F 21/85* (2013.01); *G06F 13/4282* (2013.01)

(58) Field of Classification Search
CPC .............................. G06F 21/85; G06F 13/4282
See application file for complete search history.

(56) References Cited

U.S. PATENT DOCUMENTS

| 8,793,782 | B1* | 7/2014 | Su | H04L 63/0807 713/153 |
| 2002/0011516 | A1* | 1/2002 | Lee | G06F 3/0227 235/380 |
| 2008/0091934 | A1* | 4/2008 | Peterson | G06F 21/6281 713/2 |
| 2015/0106660 | A1* | 4/2015 | Chumbalkar | G06F 11/0727 714/42 |

* cited by examiner

*Primary Examiner* — Meng Li
(74) *Attorney, Agent, or Firm* — Jackson Walker L.L.P.

(57) ABSTRACT

In accordance with embodiments of the present disclosure, an information handling system may include a host system comprising a processor, one or more external input/output (I/O) ports, a chipset communicatively coupled to the processor and including an I/O port controller, the I/O port controller interfacing between the processor and the one or more external I/O ports, and a management controller communicatively coupled to the processor configured to provide out-of-band management of the information handling system, and further configured to communicate a port security policy to a component of the chipset such that the I/O port controller dynamically enables and disables, independent of an operating state of the host system, individual ones of the one or more external I/O ports in accordance with the port security policy.

19 Claims, 2 Drawing Sheets

SYSTEMS AND METHODS FOR DYNAMIC EXTERNAL INPUT/OUTPUT PORT SCREENING

TECHNICAL FIELD

The present disclosure relates in general to information handling systems, and more particularly to methods and systems for dynamically screening external input/output ports of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use external input/output (I/O) ports, such as Universal Serial Bus (USB) ports, to allow for external coupling of various components to the information handling system, including mass storage devices (e.g., flash drives), human interface devices (e.g., keyboard/video/mouse devices), network interfaces, or other devices.

However, one disadvantage of such external ports is that they may be a point of security vulnerability, as individuals with bad intent may use external devices to perpetrate attacks through external ports, or surreptitiously place malware on an external device and an authorized but unaware user may unknowingly couple such external device to an external port, thus compromising the information handling system.

Traditionally, such vulnerabilities were reduced by disabling external ports, only to have an administrator enable such ports if and when needed. However, in such traditional approaches, information handling systems only allow for a boot time only basic input/output system (BIOS) menu option to disable various combinations of server USB ports (e.g., all external, all front, all rear, internal, etc.). However, it is a common management problem to want to authenticate a local user/technician to interact with a running information handling system through a USB port such as via a crash cart. To enable the external port to allow interaction via the USB port, a remote administrator must reboot the information handling system, change a BIOS setting for the USB port during such reboot, then reboot again to allow the setting to be applied.

Additionally, existing approaches do not allow discrimination among classes of external USB devices to be enabled or disabled.

SUMMARY

In accordance with the teachings of the present disclosure, the disadvantages and problems associated with existing approaches to management of external I/O ports of an information handling system may be reduced or eliminated.

In accordance with embodiments of the present disclosure, an information handling system may include a host system comprising a processor, one or more external input/output (I/O) ports, a chipset communicatively coupled to the processor and including an I/O port controller, the I/O port controller interfacing between the processor and the one or more external I/O ports, and a management controller communicatively coupled to the processor configured to provide out-of-band management of the information handling system, and further configured to communicate a port security policy to a component of the chipset such that the I/O port controller dynamically enables and disables, independent of an operating state of the host system, individual ones of the one or more external I/O ports in accordance with the port security policy.

In accordance with these and other embodiments of the present disclosure, a method may include, in an information handling system comprising a host system comprising a processor, one or more external input/output (I/O) ports, and a chipset communicatively coupled to the processor and including an I/O port controller, the I/O port controller interfacing between the processor and the one or more external I/O ports, dynamically enabling and disabling, independent of an operating state of the host system, individual ones of the one or more external I/O ports in accordance with a port security policy.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
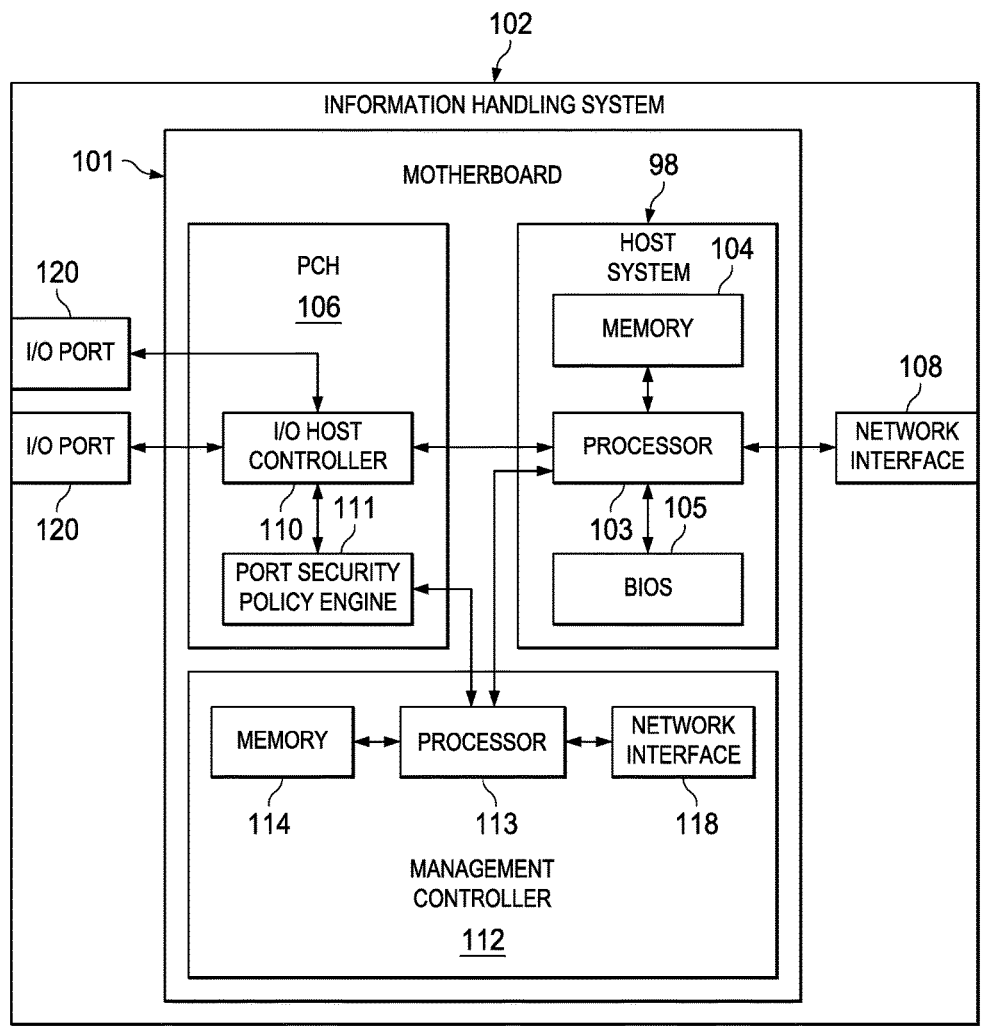
FIG. 1 illustrates a block diagram of an example information handling system, in accordance with embodiments of the present disclosure.
Figure 2:
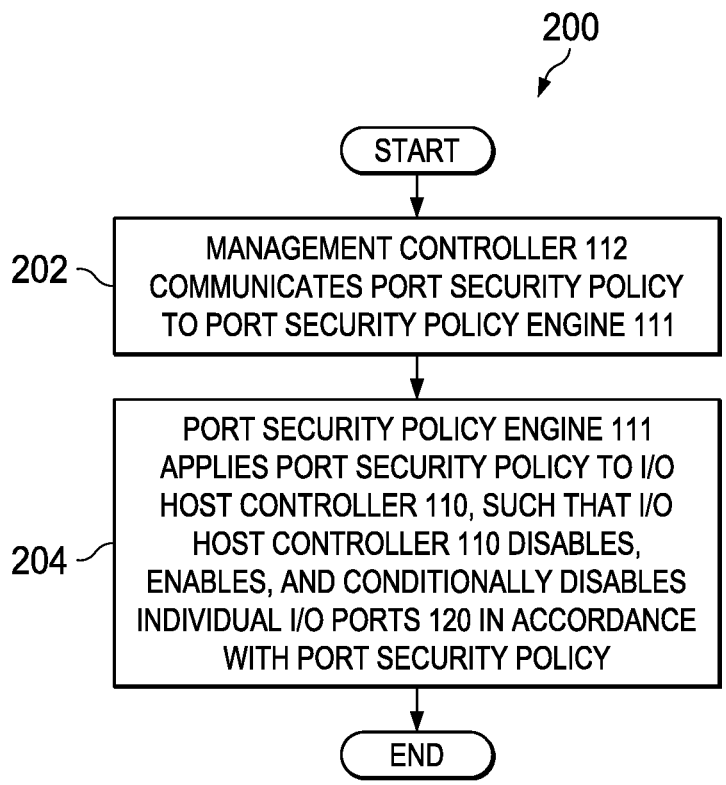
FIG. 2 illustrates a flow chart of an example method for dynamic input/output port screening, in accordance with embodiments of the present disclosure.

Preferred embodiments and their advantages are best understood by reference to FIGS. 1 and 2, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a motherboard 101, a network interface 108 communicatively coupled to a processor 103 of motherboard 101, and one or more input/output (I/O) ports communicatively coupled to a platform controller hub (PCH) 106 of motherboard 101.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include processor 103, a memory 104 communicatively coupled to processor 103, PCH 106 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. Although memory 104 is depicted in FIG. 1 as integral to motherboard 101, in some embodiments, all or a portion of memory 104 may reside external to motherboard 101.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

In operation, processor 103, memory 104, and BIOS 105 may comprise at least a portion of a host system 98.

PCH 106 may be any system, device, or apparatus configured to control certain data paths (e.g., data flow between processor 103, memory 104, and peripherals) and support certain functions of processor 103. A PCH 106 may also be known as a "chipset" of an information handling system 102. As shown in FIG. 1, PCH 106 may include, among other things, an I/O host controller 110 and a port security policy engine 111.

I/O host controller 110 may be communicatively coupled to processor 103 and comprise any system, device, or apparatus configured to manage and/or control data communications between processor 103 and a device coupled to an I/O port 120. In some embodiments, I/O host controller 110 may comprise a Universal Serial Bus (USB) controller configured to interface with and manage USB devices coupled to I/O ports 120.

Port security policy engine 111 may be communicatively coupled to processor 113 of management controller 112, and may comprise any system, device, or apparatus configured to receive from management controller 112 a port security policy for managing access of I/O ports 120, as described in greater detail below.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from in-band network interface 108. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off.

Network interface 118 may comprise any suitable system, apparatus, or device operable to serve as an interface between management controller 112 and/or one or more other information handling systems. Network interface 118 may enable management controller 112 to communicate using any suitable transmission protocol and/or standard. In these and other embodiments, network interface 118 may comprise a network interface card, or "NIC."

Network interface 108 may comprise any suitable system, apparatus, or device operable to serve as an interface between information handling system 102 and/or one or more other information handling systems. Network interface 108 may enable information handling system 102 to communicate using any suitable transmission protocol and/or standard. In these and other embodiments, network interface 108 may comprise a network interface card, or "NIC."

An I/O port 120 may comprise any system, device, or apparatus configured to receive an external device and electrically couple such external device to processor 103, and/or mechanically couple such external device to information handling system 102. For example, in some embodiments, an I/O port 120 may comprise a USB port having a connector configured to receive a corresponding connector of a USB device (e.g., a USB key drive or thumb drive). In these and other embodiments, an I/O port 120 may comprise any other type of suitable external port (e.g., Serial Advanced Technology Attachment (SATA), serial port, parallel port, etc.) to which any suitable device may be coupled.

In addition to motherboard 101, processor 103, memory 104, BIOS 105, PCH 106, network interface 108, management controller 112, and I/O ports 120, information handling system 102 may include one or more other information handling resources. Furthermore, although a certain number of various information handling resources are depicted in FIG. 1, information handling system 102 may include any suitable number of such information handling resources. For example, although FIG. 1 for the purposes of clarity and exposition shows information handling system 102 having two I/O ports 120, in some embodiments, information handling system 102 may have more or fewer I/O ports 120.

In addition, although FIG. 1 shows certain components integral to certain other components, in some embodiments, such components may be part of another component. For example, although management controller 112 is shown in FIG. 1 as being external to PCH 106, in some embodiments management controller 112 (or at least some portions thereof) may be implemented within PCH 106. As another example, although port security policy engine 111 is shown within PCH 106, in some embodiments, the functionality of port security policy engine 111 may be implemented by management controller 112.

In operation, management controller 112 may, in real time and independent of an operating state of host system 98 (e.g., off, in boot, or in operating system runtime), modify and apply a port security policy for screening and selectively enabling I/O ports 120, and communicate such policy to port security policy engine 111, which may in turn cause I/O host controller 110 to enable or disable individual I/O ports 120 based on the policy. For example, in some embodiments, a policy may simply include an enumeration of which I/O ports 120 are to be enabled and which I/O ports 120 are to be disabled. In these and other embodiments, a policy may provide that enabled I/O ports 120 are enabled without restriction. On the other hand, in some instances, a policy may provide that ports are conditionally enabled to allow communication between processor 103 and an I/O device externally coupled to an I/O port 120 provided that such device is of a certain class of devices. In such a case, port security policy engine 111 may allow I/O host controller 110 to pass communication between processor 103 and such permitted class(es) of device, while screening out other types of devices. As an example, a policy may provide that communication with a human interface device (e.g., a keyboard, video, and/or mouse) is permitted, but communication with a mass storage device or network interface card is not.

In these and other embodiments, a policy may require that for certain classes of devices, communication with such a device is only permitted when the device has particular identifying information. For example, a policy may dictate that communication with a mass storage device coupled to an I/O port is permitted if the device has a identifier (e.g., vendor identification number or product identification number) corresponding to an entry within a whitelist stored within management controller 112. As another example, in addition to or in lieu of requiring a particular identifier in order to enable communication between processor 103 and a device coupled to an I/O port 120, a policy may dictate that the device include a certificate that matches a corresponding certificate defined by the policy (e.g., stored in management controller 112). In some embodiments, a device may communicate such certificate to port security policy engine 111 in response to a query to provide the certificate after being coupled to I/O port 120.

In these and other embodiments, a policy may set forth one or more other policy parameters. For example, a policy may provide a temporal limitation to the enablement or conditional enablement of an I/O port 120 (e.g., enable I/O port 120 for two hours, then disable; enable I/O port 120 for one hour to receive a human interface device, then disable). As another example, a policy may provide that an enablement or conditional enablement of an I/O port 120 may revert to disablement of such I/O port 120 upon disconnection of a device from such I/O port 120. As a further example, a policy may provide that only a maximum number of I/O ports 120 may be populated and thus enabled, or may provide that I/O ports 120 may only be enabled for a maximum number of a particular class of device. As an additional example, a policy may provide that a hub depth of devices coupled to a single I/O port 120 is limited (e.g., communication only with devices if no more than one hub is coupled to I/O port 120).

FIG. 2 illustrates a flow chart of an example method 200 for dynamic input/output port screening, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, management controller 112 may communicate a port security policy to port security policy engine 111. Such communication may take place over any suitable interface, including without limitation Peripheral Component Interconnect Express Vendor-Defined Message (PCIe VDM), Enhanced Serial Peripheral Interface (sSPI), Inter-Integrated Circuit (I2C) interface, and I3C interface. At step 204, port security policy engine 111 may apply the port security policy to I/O host controller 110, such that I/O host controller 110 disables, enables, and conditionally disables individual I/O ports 120 in accordance with the port security policy. After step 204, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a host system comprising a processor;
one or more external input/output (I/O) ports;
a chipset communicatively coupled to the processor and including an I/O port controller, the I/O port controller being configured to interface between the processor and the one or more external I/O ports; and
a management controller communicatively coupled to the processor configured to provide out-of-band management of the information handling system, and further configured to communicate a port security policy to a component of the chipset such that the I/O port controller is configured to dynamically enable or disable, independent of an operating state of the host system, individual ones of the one or more external I/O ports in accordance with the port security policy, wherein the I/O port controller is further configured to enable no more than a maximum number of the one or more external I/O ports, wherein the maximum number is specified by the port security policy.

2. The information handling system of claim 1, wherein the chipset comprises the management controller.

3. The information handling system of claim 1, wherein the component of the chipset includes a port security policy engine interfaced between the I/O port controller and the management controller and configured to control the I/O port controller to dynamically enable or disable the individual ones of the one or more external I/O ports in accordance with the port security policy.

4. The information handling system of claim 1, wherein the one or more external I/O ports comprise Universal Serial Bus (USB) ports and the I/O port controller comprises a USB controller.

5. The information handling system of claim 1, wherein the I/O port controller is configured to conditionally enable at least one external I/O port of the one or more external I/O ports such that an external I/O device coupled to the at least one external I/O port is permitted to communicate with the processor only if the external I/O device is within one or more permitted classes of devices set forth in the port security policy.

6. The information handling system of claim 1, wherein the I/O port controller is configured to conditionally enable at least one external I/O port of the one or more external I/O ports such that an external I/O device coupled to the at least one external I/O port is permitted to communicate with the processor only if the external I/O device has one or more particular identifying characteristics as set forth in the port security policy.

7. The information handling system of claim 6, wherein the particular identifying characteristics comprise at least one of an identifier of the external I/O device or a certificate associated with the external I/O device.

8. The information handling system of claim 1, wherein the I/O port controller is configured to disable an enablement or a conditional enablement of at least one external I/O port of the one or more external I/O ports in accordance with a temporal limitation of the enablement or conditional enablement as set forth in the port security policy.

9. The information handling system of claim 1, wherein the I/O port controller is configured to disable an enablement or a conditional enablement of at least one external I/O port of the one or more external I/O ports in response to disconnection of an external I/O device from the at least one external I/O port as set forth in the port security policy.

10. The information handling system of claim 1, wherein the I/O port controller is further configured to disable individual ones of the one or more external I/O ports in accordance with a maximum hub depth of the one or more external I/O ports as set forth in the port security policy.

11. A method comprising:
dynamically enabling or disabling, independent of an operating state of a host system of an information handling system, individual ones of one or more external input/output (I/O) ports of the host system in accordance with a port security policy, wherein the dynamically enabling or disabling includes enabling no more than a maximum number of the one or more external I/O ports, wherein the maximum number is specified by the port security policy;
wherein the host system includes:
a processor; and
a chipset communicatively coupled to the processor and including an I/O port controller, the I/O port controller being configured to interface between the processor and the one or more external I/O ports.

12. The method of claim 11, wherein the one or more external I/O ports comprise Universal Serial Bus (USB) ports and the I/O port controller comprises a USB controller.

13. The method of claim 11, further comprising conditionally enabling at least one external I/O port of the one or more external I/O ports such that an external I/O device coupled to the at least one external I/O port is permitted to communicate with the processor only if the external I/O device is within one or more permitted classes of devices set forth in the port security policy.

14. The method of claim 11, further comprising conditionally enabling at least one external I/O port of the one or more external I/O ports such that an external I/O device coupled to the at least one external I/O port is permitted to communicate with the processor only if the external I/O device has one or more particular identifying characteristics as set forth in the port security policy.

15. The method of claim 14, wherein the particular identifying characteristics comprise at least one of an identifier of the external I/O device or a certificate associated with the external I/O device.

16. The method of claim 11, further comprising disabling an enablement or a conditional enablement of at least one external I/O port of the one or more external I/O ports in accordance with a temporal limitation of the enablement or conditional enablement as set forth in the port security policy.

17. The method of claim 11, further comprising disabling an enablement or a conditional enablement of at least one external I/O port of the one or more external I/O ports in response to disconnection of an external I/O device from the at least one external I/O port as set forth in the port security policy.

18. The method of claim 11, further comprising disabling individual ones of the one or more external I/O ports in accordance with a maximum hub depth of the one or more external I/O ports as set forth in the port security policy.

19. An information handling system comprising:
a host system comprising a processor;
one or more external input/output (I/O) ports;
a chipset communicatively coupled to the processor and including an I/O port controller, the I/O port controller being configured to interface between the processor and the one or more external I/O ports; and
a management controller communicatively coupled to the processor configured to provide out-of-band management of the information handling system, and further configured to communicate a port security policy to a component of the chipset such that the I/O port controller is configured to dynamically enable or disable, independent of an operating state of the host system, individual ones of the one or more external I/O ports in accordance with the port security policy, wherein the I/O port controller is further configured to enable only those ones of the one or more external I/O ports having hub depths that are in accordance with a maximum hub depth specified by the port security policy.

* * * * *